Nov. 9, 1937.   S. M. NAMPA   2,098,511
HOISTING DEVICE
Original Filed Nov. 2, 1932
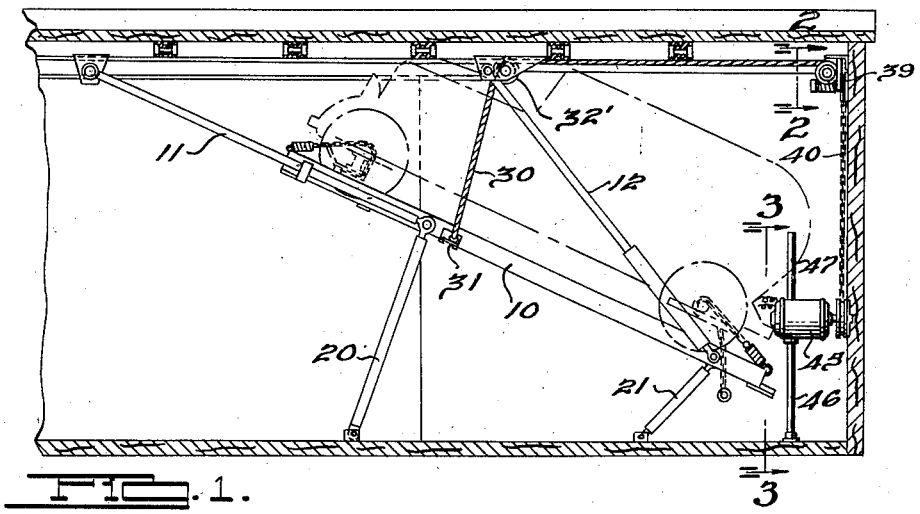
FIG. 1.
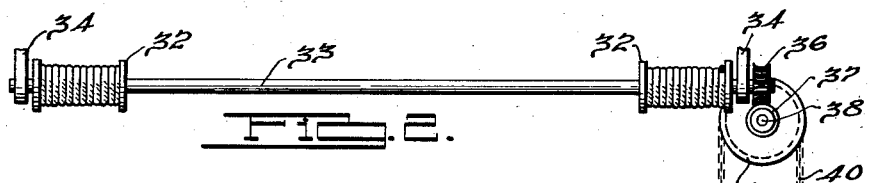
FIG. 2.
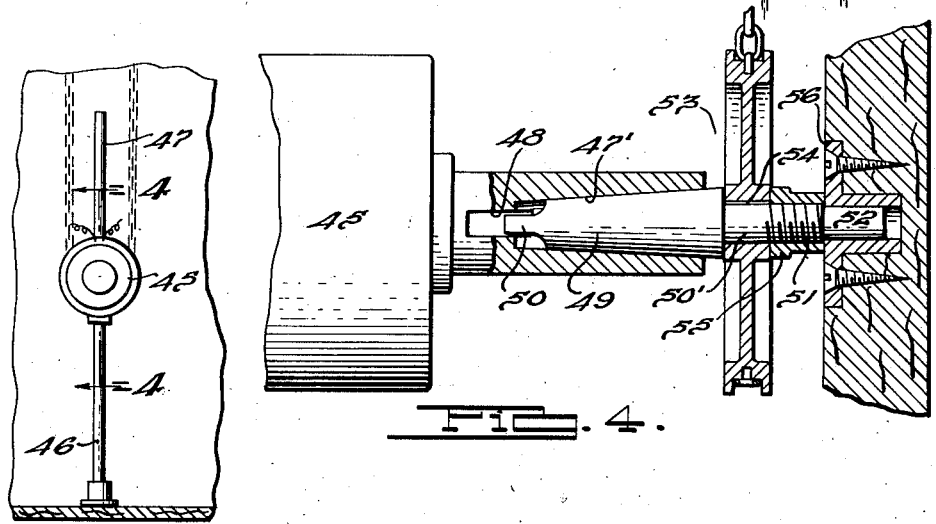
FIG. 3.
FIG. 4.
INVENTOR
*Sulo M. Nampa.*
BY
*Harness, Dickey, Pierce & Hann.*
ATTORNEYS.

Patented Nov. 9, 1937

2,098,511

UNITED STATES PATENT OFFICE 2,098,511

HOISTING DEVICE

Sulo M. Nampa, Detroit, Mich., assignor to The Worth Company, a corporation of Michigan Original application November 2, 1932, Serial No. 640,798. Divided and this application July 6, 1936, Serial No. 89,107

2 Claims. (Cl. 254—168)

The invention relates to power devices for loading automobiles in freight cars and constitutes a division of my co-pending application Serial No. 640,798, filed November 2, 1932.

The object of the invention is to provide an efficient, light, and inexpensive power means adapted to be used for the purposes above set forth in connection with the decking of the automobile.

Other objects of the invention will become apparent from the following description relating to a particular embodiment of the invention, and the claims hereinafter set forth.

Figure 1 is a fragmentary view of a freight car illustrating use of one form of the invention;

Fig. 2 is a detail view on a larger scale taken substantially along line 2—2 of Fig. 1;

Fig. 3 is a view on a larger scale taken substantially along line 3—3 of Fig. 1;

Fig. 4 is a cross-sectional view on a larger scale taken substantially along line 4—4 of Fig. 3.

Referring to Fig. 1, the loading frame is indicated at 10, front supporting rods pivotally connected to the frame and car at 11, and rear telescopic rods pivotally connecting the frame and car at 12. The frame is adapted to swing from the floor to a semi-decking position and even beyond this position, to a position adjacent the roof. When the frame is in its semi-decking position, it may be supported by front brace rods 20 and rear brace rods 21.

For raising the frame, flexible members such as steel cables 30 are secured at one end to opposite sides of the frame 10 respectively, as indicated at 31, and extend upwardly where they are trained over rollers 32' journalled in brackets secured to the roof of the car. The cables then extend toward the end wall of the car along the roof and at the upper edge of the end wall, they are wound around a pair of drums 32 secured to opposite ends of a shaft 33 that in turn is journalled in brackets 34 secured to the car at the upper edge of the end wall. The end of that portion of each cable wound around its respective drum, is positively secured to the drum at one point to prevent possible separation of the cable from the drum.

One end of the shaft has a worm wheel 36 secured thereto, which meshes with a worm 37 secured on a stub-shaft 38 also journalled in one of the brackets 34. The stub-shaft 38 also is provided with a sprocket wheel 39 and an endless chain 40 is trained about the sprocket wheel and extends downwardly along the end wall of the car to a point convenient for manipulation of the chain, to turn the sprocket wheel and hence the shaft 33 carrying the drums. The worm and worm wheel connection are of such character that they lock the rotary parts against accidental rotation and it is necessary to move the chain 40 in one direction or the other in order to cause rotation of shaft 33.

While manual manipulation of the chain 40 for the purpose of raising the frame is very effective, and an operator does not have to exert an excessive force, it will be appreciated that the sprocket wheel 39 will have to be rotated a large number of times in order to effect sufficient rotation of the shaft 33 to raise the frame. This requires some time and furthermore requires the operator to repeatedly exert the force required to pull the chain. In order to expedite raising of the frame, power means of transportable character are provided for moving the chain and thus turning the sprocket wheel 39. This power means is illustrated in Fig. 1, and comprises a motor frame 45 which may have arms 46 and 47 projecting from diametrically opposite sides thereof, and one of which preferably is adapted to rest on the floor of the freight car. These arms facilitate manual holding of the motor in position. The motor may constitute part of an electrical drill equipment in which, as shown by Fig. 4, the shaft of the motor has a tapered socket 47' and a slot 48 in the base of the socket.

The drill of the drill mechanism may also be employed and the tapered shaft portion of this drill is indicated at 49 and it will be noted that the drill has a reduced portion 50 at its inner end adapted to project into the slot 48, thus positively locking the shaft of the motor with the drill for simultaneous rotation. Instead of providing on the opposite end of the drill, a drill element which ordinarily is oppositely tapered, this oppositely tapered portion is turned down to provide a cylindrical portion 50' threaded at its outer end as indicated at 51, and a reduced pin portion 52. The cylindrical portion 50' is adapted to receive a sprocket wheel 53 which may be keyed thereto as indicated at 54 and for holding the sprocket wheel in position, a nut 55 may be threaded on the threaded portion 51 and against the wheel. The sprocket wheel 53 is adapted to fit between the sides of the chain 40 at the lower end of the latter and to rotate thus driving the chain and rotating the upper sprocket wheel 39. The pin portion 52 of reduced character, is adapted to fit into a metal pilot 56 fastened in the end wall of the car in such position that when the sprocket wheel is disposed in driving relation to the lower end of the chain, the pin fits into the pilot although it will be appreciated that the pin must rotate in the pilot. The pilot serves as a guide and centering means for the power means and greatly assists in the positioning thereof during its operation.

The motor, of course, operates at a fairly high rate of speed and, accordingly, very little time is required to revolve the chain sufficiently to raise the frame 10 to the position desired whether it be to the semi-decking position or to a position adjacent the roof of the car. The power means obviously can be readily separated from the chain and the car, thus avoiding carrying any equipment that would be in the way. Furthermore, one of the power means can be used for loading any number of freight cars, thus avoiding the use of power means in each car for each loading device.

Although only one form of the invention has been described and illustrated, it will be appreciated by those skilled in the art that various modifications may be made without departing from the scope of the claims.

What I claim is:

1. A transportable power device for use in conjunction with freight car loading devices comprising a motor, a shaft driven by the motor, a power sheave on the shaft, and pilot means on the end of the shaft beyond the sheave and adapted to cooperate with a stationary pilot means for anchoring the device during use.

2. A transportable power device for use in conjunction with freight car loading devices, comprising a motor, a shaft driven by the motor, a power sheave on the shaft, pilot means on the end of the shaft beyond the sheave and adapted to cooperate with stationary pilot means for anchoring the device during use, and an anchoring leg operatively secured to the motor and adapted to cooperate with a stationary supporting surface.

SULO M. NAMPA.